United States Patent [19]

Weder

[11] Patent Number: 5,782,057

[45] Date of Patent: *Jul. 21, 1998

[54] METHOD AND APPARATUS FOR WRAPPING A FLORAL GROUPING WITH MULTIPLE SHEET WRAPPER

[75] Inventor: Donald E. Weder, Highland, Ill.

[73] Assignee: Southpac Trust International, Inc.

[ * ] Notice: The term of this patent shall not extend beyond the expiration date of Pat. No. 5,596,862.

[21] Appl. No.: 837,620

[22] Filed: Apr. 21, 1997

Related U.S. Application Data

[63] Continuation of Ser. No. 469,096, Jun. 6, 1995, Pat. No. 5,636,493, which is a continuation of Ser. No. 923,202, Oct. 13, 1992, Pat. No. 5,596,862, which is a continuation-in-part of Ser. No. 803,318, Dec. 4, 1991, Pat. No. 5,344,016, which is a continuation-in-part of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, which is a continuation-in-part of Ser. No. 249,761, Sep. 26, 1988, abandoned, said Ser. No. 469,096, is a continuation-in-part of Ser. No. 46,504, Apr. 12, 1993, abandoned, which is a continuation of Ser. No. 842,817, Feb. 27, 1992, abandoned, which is a continuation of Ser. No. 586,092, Sep. 19, 1990, abandoned, which is a continuation of Ser. No. 393,992, Aug. 15, 1989, Pat. No. 4,989,396.

[51] Int. Cl.$^6$ .............................. B65B 51/02; B65B 61/06
[52] U.S. Cl. ........................... 53/397; 53/399; 53/449; 53/465
[58] Field of Search ........................... 53/397, 399, 416, 53/449, 462, 465, 461, 472

[56] References Cited

U.S. PATENT DOCUMENTS

| 557,526 | 3/1896 | Egge . |
| 732,889 | 7/1903 | Paver . |
| 1,525,015 | 2/1925 | Weeks . |

(List continued on next page.)

FOREIGN PATENT DOCUMENTS 2610604  8/1988  France .

OTHER PUBLICATIONS

Guardsman Twin-Wrap Florist Paper, Hampshire Paper Company, brochure—one page, marketed around Jan. 1992 to the best of Applicant's knowledge. The brochure shows a roll of florist wrapping paper interwound with florist wax paper. Neither sheet included an adhesive for securing the wrap in a wrapped position about the flowers, and the sheets were not connected.

"A World of Cut Flower and Pot Plant Packaging", Klerk's Plastic Products Manufacturing Inc. Brochure, date unknown, 6 pages. Applicant admits that the products described in this brochure have been on sale at least more than one year prior to the filing of the present patent application.

"The Simple Solution For Those Peak Volume Periods", Highland Supply Speed Cover® Brochure, 1989©, 6 pages.
"Speed Sheets® And Speed Rolls", Highland Supply Speed Sheets® Brochure, 1990©, 2 pages.

Primary Examiner—Horace M. Culver
Attorney, Agent, or Firm—Dunlap & Codding, P.C.

[57] ABSTRACT

A wrapper for a floral grouping comprising a first and a second sheet of material. The first sheet of material is constructed of a polymer film, metal foil, fabric, denim, cellophane or burlap. The second sheet of material is constructed of a paper. At least one of the first and the second sheets of material includes a closure bonding material on at least one of the upper and lower surfaces of such sheet of material. The second sheet of material is disposed adjacent the first sheet of material and the two sheets of material then are wrapped about the floral grouping with the closure bonding material bondingly engaging a portion of at least one of the first and the second sheets of material for cooperating to secure the first and the second sheets of material in a wrapped condition about the floral grouping to form the wrapper. The first or the second sheets of material, in one form, includes spots of connecting bonding material or raised portions for forming spaces between the first and the second sheets of material for insulation.

10 Claims, 5 Drawing Sheets

U.S. PATENT DOCUMENTS

| | | | |
|---|---|---|---|
| 1,538,277 | 5/1925 | Dula. | |
| 1,863,216 | 6/1932 | Wordingham. | |
| 1,865,535 | 7/1932 | Meany. | |
| 1,978,631 | 10/1934 | Herrlinger | 91/68 |
| 2,043,829 | 9/1936 | Grant et al. | 93/2 |
| 2,048,123 | 7/1936 | Howard | 229/87 |
| 2,170,147 | 8/1939 | Lane | 206/56 |
| 2,278,673 | 4/1942 | Savada et al. | 154/43 |
| 2,371,985 | 3/1945 | Frieberg | 206/46 |
| 2,411,328 | 11/1946 | MacNab | 33/12 |
| 2,510,120 | 6/1950 | Leander | 117/122 |
| 2,524,162 | 10/1950 | Chavannes et al. | 53/449 X |
| 2,529,060 | 11/1950 | Trillich | 117/68.5 |
| 2,544,075 | 3/1951 | Ernst et al. | 150/49 |
| 2,621,142 | 12/1952 | Wetherell | 154/117 |
| 2,822,287 | 2/1958 | Avery | 117/14 |
| 2,846,060 | 8/1958 | Yount | 206/58 |
| 2,883,262 | 4/1959 | Borin | 21/56 |
| 3,022,605 | 2/1962 | Reynolds | 47/58 |
| 3,113,712 | 12/1963 | Kindseth | 229/14 |
| 3,121,647 | 2/1964 | Harris et al. | 118/202 |
| 3,130,113 | 4/1964 | Silman | 161/97 |
| 3,148,799 | 9/1964 | Meroney | 220/63 |
| 3,215,330 | 11/1965 | Thomas | 229/14 |
| 3,271,922 | 9/1966 | Wallerstein et al. | 53/3 |
| 3,508,372 | 4/1970 | Wallerstein et al. | 53/3 |
| 3,514,012 | 5/1970 | Martin | 220/63 |
| 3,620,366 | 11/1971 | Parkinson | 206/59 C |
| 3,660,958 | 5/1972 | Garrison | 53/3 |
| 3,681,105 | 8/1972 | Milutin et al. | 117/15 |
| 3,757,990 | 9/1973 | Buth | 220/63 R |
| 3,927,821 | 12/1975 | Dunning | 229/14 BL |
| 4,054,697 | 10/1977 | Reed et al. | 428/40 |
| 4,216,620 | 8/1980 | Weder et al. | 47/72 |
| 4,322,931 | 4/1982 | Niepmann | 53/449 |
| 4,333,267 | 6/1982 | Witte | 47/84 |
| 4,379,101 | 4/1983 | Smith | 264/40.3 |
| 4,380,564 | 4/1983 | Cancio et al. | 428/167 |
| 4,413,725 | 11/1983 | Bruno et al. | 206/45.33 |
| 4,546,875 | 10/1985 | Zweber | 206/0.82 |
| 4,733,521 | 3/1988 | Weder et al. | 53/397 |
| 4,765,464 | 8/1988 | Ristvedt | 206/0.82 |
| 4,989,396 | 2/1991 | Weder et al. | 53/397 |
| 5,111,638 | 5/1992 | Weder | 53/397 |
| 5,181,364 | 1/1993 | Weder | 53/397 |
| 5,428,939 | 7/1995 | Weder et al. | 53/399 X |
| 5,509,251 | 4/1996 | Weder et al. | 53/399 |
| 5,595,046 | 1/1997 | Weder | 53/465 X |
| 5,596,862 | 1/1997 | Weder | 53/465 X |
| 5,636,493 | 6/1997 | Weder | 53/449 X |
| 5,653,089 | 8/1997 | Weder | 53/449 X |
| 5,701,720 | 12/1997 | Weder | 53/465 X |

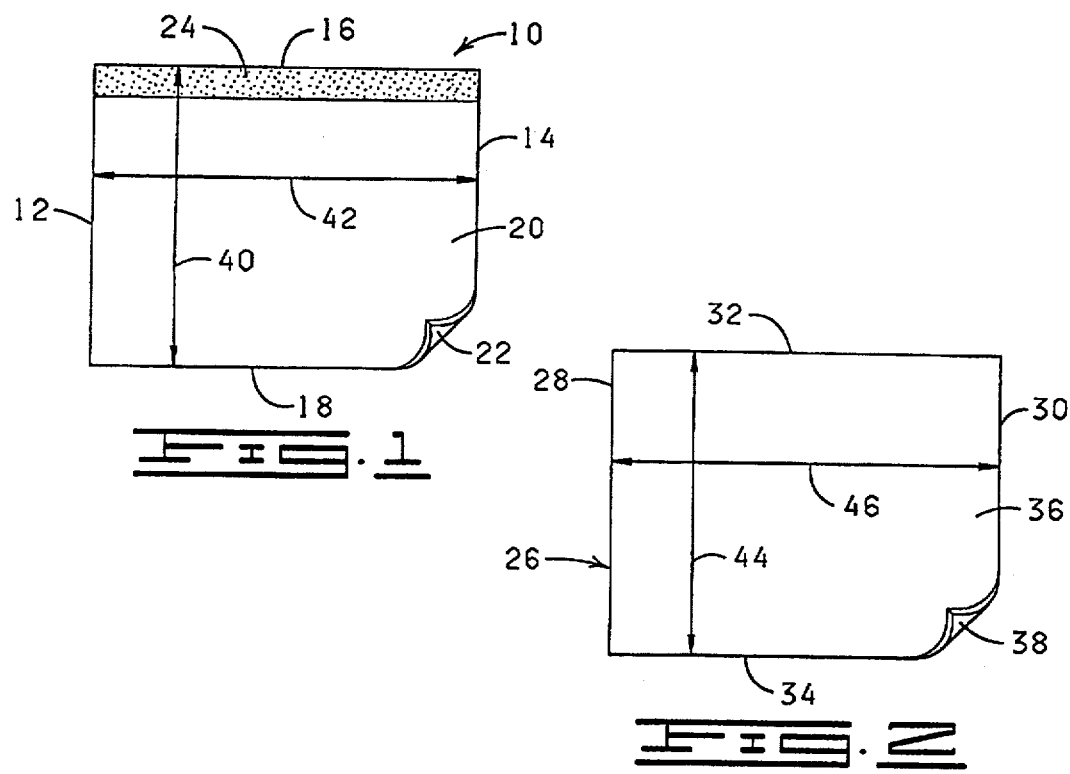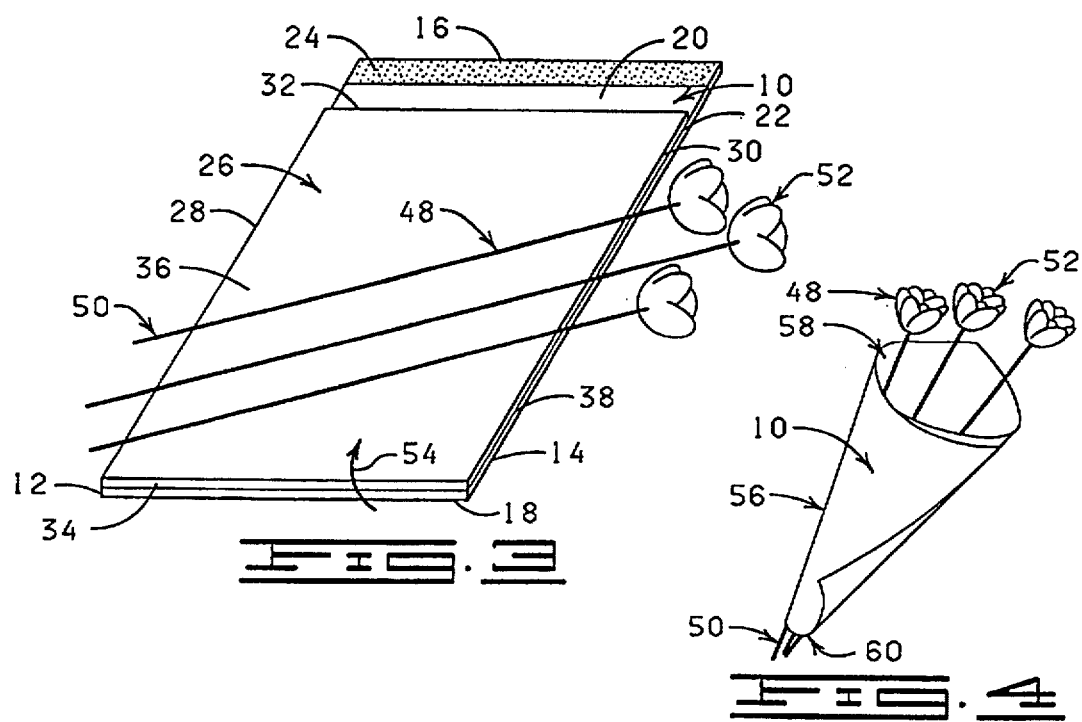

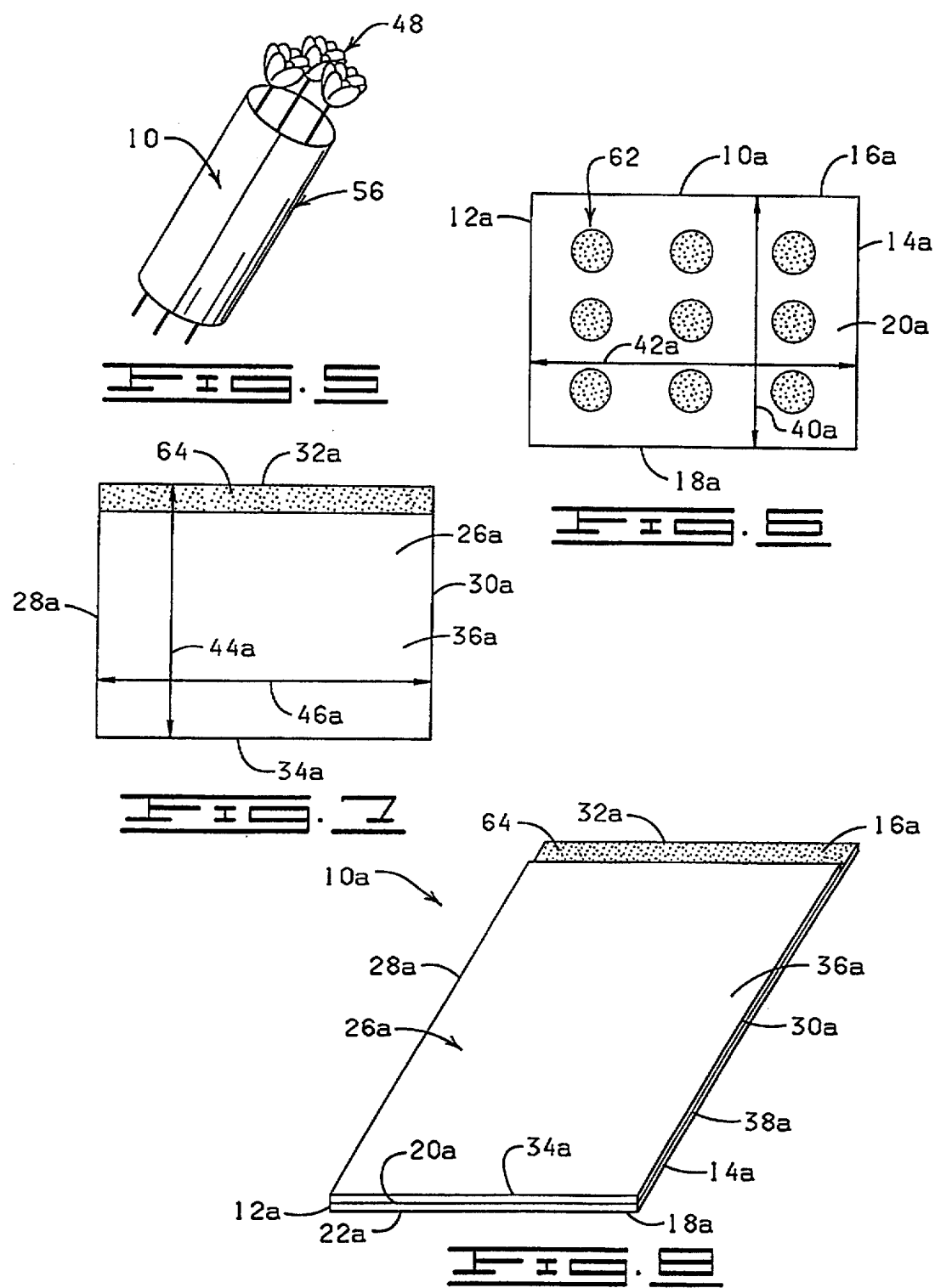

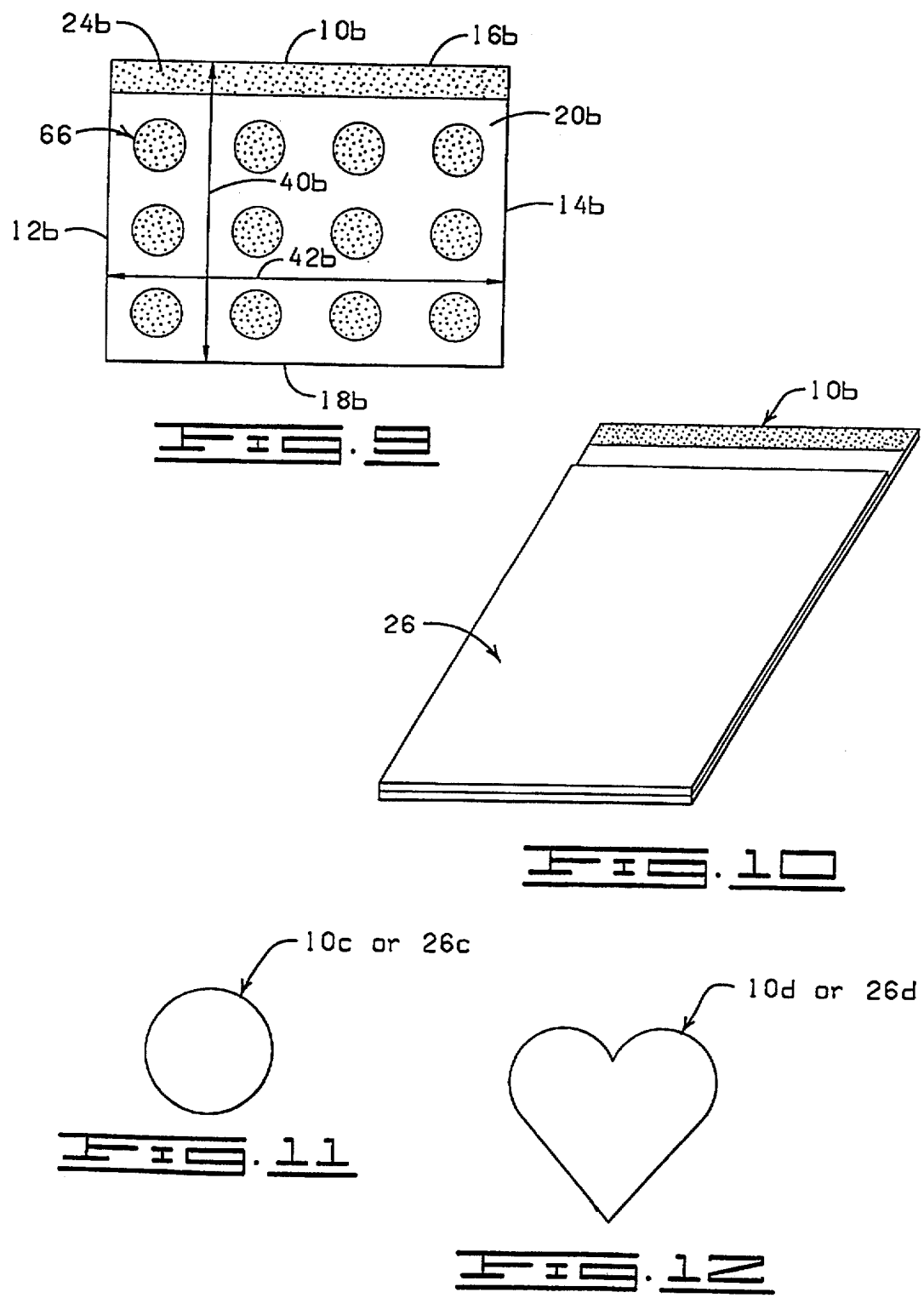

5,782,057

1

METHOD AND APPARATUS FOR WRAPPING A FLORAL GROUPING WITH MULTIPLE SHEET WRAPPER

CROSS REFERENCE TO RELATED APPLICATIONS

The present application is a continuation of U.S. Ser. No. 08/469,096, filed Jun. 6, 1995, entitled "METHOD AND APPARATUS FOR WRAPPING A FLORAL GROUPING WITH MULTIPLE SHEET WRAPPER" now U.S. Pat. No. 5,636,493, which is a continuation of U.S. Ser. No. 923,202, filed Oct. 13, 1992, entitled "METHOD AND APPARATUS FOR WRAPPING A FLORAL GROUPING WITH MULTIPLE SHEET WRAPPER", now U.S. Pat. No. 5,596,862, issued Jan. 28, 1997, which is a continuation-in-part of U.S. Ser. No. 803,318, filed Dec. 4, 1991, entitled "WRAPPING MATERIAL FOR WRAPPING A FLORAL GROUPING HAVING STAGGERED STRIPS OF ADHESIVE APPLIED THERETO AND METHOD", now U.S. Pat. No. 5,344,016, issued Sep. 16, 1994, which is a continuation-in-part of U.S. Ser. No. 707,417, filed May 28, 1991, entitled "WRAPPING A FLORAL GROUPING WITH SHEETS HAVING ADHESIVE OR COHESIVE MATERIAL APPLIED THERETO", now abandoned, which is a continuation of U.S. Ser. No. 502,358, filed Mar. 29, 1990, now abandoned, entitled "WRAPPING A FLORAL GROUPING WITH SHEETS HAVING ADHESIVE OR COHESIVE MATERIAL APPLIED THERETO", which is a continuation-in-part of U.S. Ser. No. 391,463, filed Aug. 9, 1989, entitled "ADHESIVE APPLICATOR", now abandoned, which is a continuation-in-part of U.S. Ser. No. 249,761, filed Sep. 26, 1988, now abandoned, entitled "METHOD FOR WRAPPING AN OBJECT IN A MATERIAL HAVING PRESSURE SENSITIVE ADHESIVE THEREON".

Said Ser. No. 08/469,096 is also a continuation-in-part of U.S. Ser. No. 08/046,504, filed Apr. 12, 1993, entitled "CURL WRAP AND METHODS FOR USING SAME", now abandoned, which is a continuation of U.S. Ser. No. 07/842,817, filed Feb. 27, 1992, entitled "CURL WRAP AND METHODS FOR USING SAME", now abandoned, which is a continuation of U.S. Ser. No. 07/586,092, filed Sep. 19, 1990, entitled "CURL WRAP AND METHODS FOR USING SAME", now abandoned, which is a continuation of U.S. Ser. No. 07/393,992, filed Aug. 15, 1989, entitled "CURL WRAP AND METHODS FOR USING SAME", now U.S. Pat. No. 4,989,396, issued Feb. 5, 1991.

FIELD OF THE INVENTION

The present invention generally relates to wrappers for floral groupings and, more particularly, but not by way of limitation, to a multiple sheet wrapper for floral grouping having a first sheet of material preferably constructed of a material other than paper and a second sheet of material constructed of paper where the first and the second sheets of material are disposed generally adjacent each other and the two sheets of material are wrapped about the floral grouping.

BRIEF DESCRIPTION OF THE DRAWINGS

FIG. 1 is a top plan view of a first sheet of material with one end turned up.

FIG. 2 is a top plan view of a second sheet of material with one end turned up.

FIG. 3 is a perspective view showing the first and the second sheets of material disposed adjacent each other with a floral grouping disposed on the second sheet of material in a position for wrapping the first and the second sheets of material about the floral grouping.

FIG. 4 is a diagrammatic, perspective view showing the first and the second sheets of material of FIG. 3 wrapped about the floral grouping.

FIG. 5 is a perspective view showing the first and the second sheets of material of FIG. 3 wrapped about the floral grouping in a modified manner as compared to the wrapper shown in FIG. 4.

FIG. 6 is a plan view of a modified first sheet of material.

FIG. 7 is a plan view of a modified second sheet of material.

FIG. 8 is a perspective view of the first and the second sheets of material shown in FIGS. 6 and 7 disposed adjacent each other in a condition for being wrapped about a floral grouping.

FIG. 9 is a plan view of another modified first sheet of material which may be used in connection with the second sheet of material shown in FIG. 2.

FIG. 10 is a perspective view showing the first sheet of material of FIG. 9 disposed adjacent the second sheet of material of FIG. 2 in a condition for being wrapped about a floral grouping.

FIG. 11 is a plan view of a modified first or second sheet of material.

FIG. 12 is a plan view of yet another modified typical first or second sheet of material.

DESCRIPTION OF THE PREFERRED EMBODIMENTS

Figure 13:
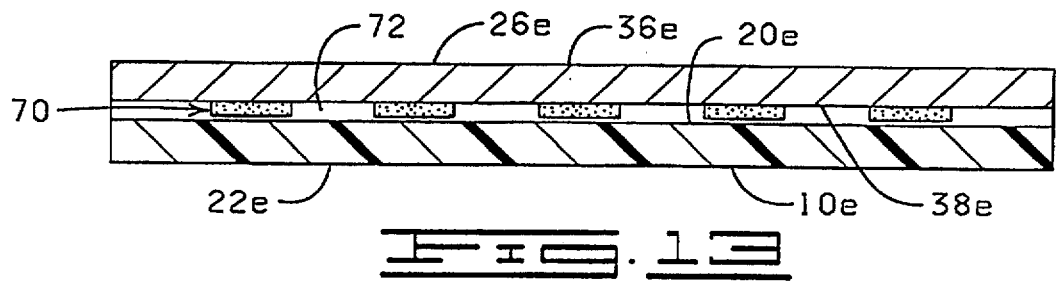
FIG. 13 is a sectional view of a modified first and second sheets of material.

Shown in FIG. 1 and designated therein by the general reference numeral 10 is a first sheet of material. The first sheet of material 10 has a first end 12, a second end 14, a first side 16, a second side 18, an upper surface 20 and a lower surface 22.

A closure bonding material 24 is disposed on the upper surface 20 of the first sheet of material. As shown in FIG. 1, the closure bonding material 24 is disposed adjacent the first side 16 of the first sheet of material 10 and extends between the first and the second ends 12 and 14 of the first sheet of material 10. As shown in FIG. 1, the closure bonding material 24 is disposed on the upper surface 20 in a strip of closure bonding material 24, although the closure bonding material 24 also could be applied to the upper surface 20 of the first sheet of material 10 in the form of spaced apart spots or the closure bonding material 24 also could be disposed on the upper surface 20 of the first sheet of material 10 in any other geometric forms and in any pattern including covering the entire upper surface 20 of the first sheet of material 10. In this last-mentioned instance, the closure bonding material and the connecting bonding material would be contained within the bonding material covering the first sheet of material 10. The term "spot" or "spots" includes any geometric shape of spot including but not by way of limitation what is commonly referred to as strips.

The first sheet of material 10 is constructed from any suitable flexible material that is capable of being wrapped about the floral grouping 48, as described herein. Preferably, the first sheet of material 10 is constructed of a material other than paper and more preferably is constructed of a material selected from a group of materials consisting of metal foil, cloth (natural or synthetic), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The first sheet of material 10 has a thickness in a range from about 0.1 mils to about 30 mils. Preferably, the sheet of material 10 has a thickness in a range from about 0.1 mils to about 5 mils.

The first sheet of material 10 may be any shape and a square or rectangular shape is shown in FIG. 1 only by way of example. The first sheet of material 10 for example only may be square, rectangular, circular or any other geometric shape such as heart shaped for example only.

The first sheet of material 10 may be constructed of a single layer of material or a plurality of layers of the same or different types of materials. Any thickness of the first sheet of material 10 may be utilized in accordance with the present invention as long as the first sheet of material 10 is wrappable about the floral grouping 48, as described herein. The layers of material comprising the first sheet of material 10 may be connected together or laminated or may be separate layers.

Shown in FIG. 2 is a second sheet of material 26. The second sheet of material 26 has a first end 28, a second end 30, a first side 32, a second side 34, an upper surface 36 and a lower surface 38. The second sheet of material is constructed of paper. The term "paper" as used herein means treated or untreated paper, corrugated paper or cardboard or any other form of paper material.

The first sheet of material has a length 40 extending between the first and the second sides 16 and 18 of the first sheet of material 10. The first sheet of material 10 also has a width 42 extending between the first and the second ends 12 and 14 of the first sheet of material 10.

The second sheet of material 26 has a length 44 extending between the first and the second sides 32 and 34 of the second sheet of material 26. The second sheet of material 26 has a width 46 extending between the first and the second ends 28 and 30 of the second sheet of material 26. The length 44 of the second sheet of material 26 is less than the length 40 of the first sheet of material 10 so that, when the first sheet of material 10 is disposed adjacent the second sheet of material 26, a portion of the first sheet of material 10 adjacent the first side 16 thereof extends a distance beyond the first side 32 of the second sheet of material 26, in a manner and for reason which will be described in greater detail below.

The first sheet of material has a thickness in a range from about 0.5 mils to about 30 mils and preferably the thickness of the first sheet of material is in a range from about 0.5 mils to about 10 mils. The first sheet of material 10 is constructed of a material which is flexible.

The second sheet of material 26 has a thickness in a range from about 0.1 mils to about 30 mils and preferably in a range from about 0.1 mils to about 10 mils. The second sheet of material 26 is flexible, but relatively rigid compared to the first sheet of material 10.

The second sheet of material 26 may be any shape and a square or rectangular shape is shown in FIG. 2 only by way of example. The second sheet of material for example only may be square, rectangular, circular or any other geometric shape.

The second sheet of material 26 may be constructed of a single layer of materials or a plurality of layers of the same or different types of materials. Any thickness of the second sheet of material 26 may be utilized in accordance with the present invention as long as the second sheet of material 26 is wrappable about the floral grouping 48, as described herein, and as long as the second sheet of material 26 provides the rigidity described herein or the absorbency described herein or both. The layers of material comprising the second sheet of material 26 may be connected together or laminated or may be separate layers.

In operation, the second sheet of material 26 is placed adjacent the first sheet of material 10 as shown in FIG. 3. In this position, the lower surface 38 of the second sheet of material 26 is disposed adjacent the upper surface 20 of the first sheet of material 10. The width 42 of the first sheet of material 10 is about equal to the width 46 of the second sheet of material 26 so that, when the first and the second sheets of material 10 and 26 are disposed adjacent each other, the first end 28 of the second sheet of material is generally aligned with the first end 12 of the first sheet of material 10, the second end 30 of the second sheet of material 26 is generally aligned with the second end 14 of the first sheet of material 10, the second side 18 of the first sheet of material 10 is generally aligned with the second side 34 of the second sheet of material and the first side 16 of the first sheet of material 10 extends a distance beyond the first side 32 of the second sheet of material 26 so that the closure bonding material on the upper surface 20 of the first sheet of material 10 is exposed and not covered by the second sheet of material 26.

It should be noted that the first and the second sheets of material 10 and 26 each could have virtually identical lengths 40 and 44. In this case, the second sheet of material 26 is disposed on the first sheet of material 20 in such a manner that the second side 34 of the second sheet of material 26 extends a distance beyond the second side 18 of the first sheet of material 10 whereby the first side 16 of the first sheet of material 10 is spaced a distance from the first side 32 of the second sheet of material 26 thereby leaving the closure bonding material 24 on the first sheet of material 10 exposed and not covered by the second sheet of material 26.

A floral grouping 48 having a stem end 50 and a bloom end 52 (FIG. 3) is disposed on the upper surface 36 of the second sheet of material 26. The first and the second sheets of material 10 and 26 then are wrapped about the floral grouping 48 by taking the second sides 18 and 34 of the first and the second sheets of material 10 and 26 and rolling the first and the second sheets of material 10 and 26 in a direction 54 about the floral grouping 48. The first and the second sheets of material 10 and 26 are continued to be rolled about the floral grouping 48 until a portion of the closure bonding material 24 is disposed adjacent a portion of the lower surface 22 of the first sheet of material 10 and brought into bonding contact or engagement therewith thereby bondingly connecting the closure bonding material 24 on the upper surface 20 of the first sheet of material 10 to a portion of the lower surface 22 of the first sheet of material 10 for cooperating to secure the first and the second sheets of material 10 and 26 in a wrapped condition about the floral grouping 48 to provide a wrapper 56 wrapped about the floral grouping 48, as shown in FIG. 4.

In the wrapped condition with the first and the second sheets of material 10 and 26 wrapped about the floral grouping 48 as shown in FIG. 4, the wrapper 56 forms a conical shaped with an opened upper end 58 and an opened lower end 60. The wrapper 56 covers a portion of the bloom end 52 of the floral grouping 48. A portion of the stem end 50 of the floral grouping 48 extends through the opened lower end 60 of the wrapper 56. The wrapper 56 is tightly wrapped about the stem end 50 of the floral grouping 48. The closure bonding material 24 on the first sheet of material 10 may contact and engage some of the stem end 50 of the floral grouping 48 to cooperate in securing the wrapper 56 tightly wrapped about the stem end 50 and to prevent the floral grouping 48 from slipping or moving within the wrapper 56.

At least a portion of the floral grouping 48 is disposed within the wrapper 56. In some applications, the stem end 50 of the floral grouping 48 extends through the open lower end 60 of the wrapper 56, as described before. In some applications, the wrapper is tightly wrapped about the stem end 50 of the floral grouping 48. The bloom end 52 of the floral grouping 48 is disposed near the open upper end 58 of the floral grouping 48 and the bloom end 52 of the floral grouping 48 is visible via the open upper end 58 of the wrapper 56. In some instances, the bloom end 52 of the floral grouping 48 may extend beyond the open upper end 58 of the wrapper 56. In some applications, the upper end 58 of the wrapper 56 may be closed if desired. In some applications, the lower end 60 of the wrapper 56 may be closed if desired.

The wrapper 56, as shown in FIG. 4, is generally conically shaped. The sheets of material 10 and 26 may be wrapped about the floral grouping 48 to form a cylindrically shaped wrapper or any other shape wrapper if desired in a particular application.

The closure and connecting bonding materials described herein preferably are a pressure sensitive adhesive. The closure or connecting bonding materials described herein may be a cohesive and, in this instance, a cooperating cohesive material also would be disposed on a portion of the lower surface 22 of the first sheet of material 10 for bondingly engaging the cohesive closure bonding material 24 on the upper surface 20 of the first sheet of material 10 for example for bondingly securing the overlapping portions to secure the sheets of material 10 and 26 in a wrapped condition to form the wrapper 56 extending about the floral grouping 48. The closure or connecting bonding materials also may be a heat sealing lacquer and, in this instance, heat is applied to secure the first sheet of material 10 wrapped about the floral grouping 48 for example. The closure or connecting bonding materials also may be in the form of the sheet of material being constructed of a heat sealable material and, in this instance, heat again would be applied to secure to effect the bond. The term "bonding material" as used herein includes any means for connecting the desired materials.

"Floral grouping" as used herein means cut fresh flowers, artificial flowers, a single flower, other fresh and/or artificial plants or other floral materials and may include other secondary plants and/or ornamentation which add to the aesthetics of the overall floral grouping.

A decorative pattern, such as a color and/or an embossed pattern, and/or other decorative surface ornamentation may be applied to the upper surface and/or the lower surface of either or both of the sheet of material 10 and 26 or portions thereof including, but not limited to printed design, coatings, colors, flocking or metallic finishes. Either or both of the sheets of material 10 or 26 also may be totally or partially clear or tinted transparent material.

The second sheet of material 26 is constructed of a relatively rigid, flexible sheet of material capable of being wrapped about the floral grouping 48 whereby the second sheet of material 26 cooperates to add rigidity to the first and the second sheets of material 10 and 26 for cooperate to support the first and the second sheets of material 10 and 26 wrapped about the floral grouping 48 in the form of the wrapper 56. Also, the second sheet of material 26 preferably is constructed of an insulation type of material for providing insulation when the first and the second sheets of material 10 and 26 are wrapped about the floral grouping 48 to form the wrapper 56. The second sheet of material 26 also preferably is capable of absorbing water so that, when the first and the second sheets of material 10 and 26 are wrapped about the floral grouping 48 to form the wrapper 56, the second sheet of material 26 is disposed adjacent the floral grouping 48 and absorbs water from the floral grouping 48.

The second sheet of material may be disposed on the outer surface of the wrapper 56, rather than the inner surface of the wrapper 56 adjacent the floral grouping 48 if desired in a particular application.

Embodiment of FIG. 5

Shown in FIG. 5 is the floral grouping 48 wrapped with the wrapper 56 comprising the first sheet of material 10 and the second sheet of material 26. The first and the second sheets of material 10 and 26 are wrapped about the floral grouping 48 to provide a cylindrically shaped wrapper 56 rather than a conically shaped wrapper 56 is shown in FIG. 4. The cylindrically shaped wrapper 56 shown in FIG. 5 may be a more desirable technique for wrapping the floral grouping 48 which may be desired in some applications.

Embodiments of FIGS. 6, 7 and 8

Shown in FIG. 6 is a modified first sheet of material 10a which is constructed exactly like the first sheet of material 10 described in detail before, except the sheet of material 10a does not include the closure bonding material 24. Rather, the sheet of material 10a includes a connecting bonding material 62 disposed on the upper surface 20 of the first sheet of material 10a. As shown in FIG. 6, the connecting bonding material 62 is in the form of a plurality of spaced apart of spots of connecting bonding material disposed on the upper surface 20a. The connecting bonding material 62 could cover the entire upper surface 20a or could be disposed on the upper surface 20a in strips or in any other geometric pattern desired in any particular application, or any other form as previously described in connection with the closure bonding material.

Shown in FIG. 7 is a modified second sheet of material 26a which is constructed exactly like the second sheet of material 26 shown in FIG. 2 and described in detail before, except the second sheet of material 26a includes a closure bonding material 64 disposed on the upper surface 36a of the second sheet of material 26a. The closure bonding material 64 is in the form of a strip of bonding material disposed adjacent the first side 32a and extending between the first and the second ends 28a and 30a of the second sheet of material 26a. The closure bonding material 24 may be in any form as previously described in connection with the closure bonding material.

In operation, the second sheet of material 26a is disposed on the first sheet of material 10a, as shown in FIG. 8 with the lower surface 38a of the second sheet of material 26a being disposed adjacent the upper surface 20a of the first sheet of material 10a. In this position, the first end 12a of the first sheet of material 10a is aligned with the first end 28a of the second sheet of material 26a, the second end 14a of the first sheet of material 10a is aligned with the second end 30a of the second sheet of material 26a, the first side 16a of the first sheet of material 10a is aligned with the first side 32a of the second sheet of material 26a and the second side 18a of the first sheet of material 10a is aligned with the second side 34a of the second sheet of material 26a. In this particular embodiment, the length 40a of the first sheet of material 10a is the same as the length 44a of the second sheet of material 26a, although the lengths 40a and 44a and the widths 42a and 46a could be different if desired.

The first sheet of material 10a is bonded to the second sheet of material 26a by way of the connecting bonding material 62 on the upper surface 20a of the first sheet of material 10a. In this instance, it is contemplated that the connecting bonding material 62 is a pressure sensitive adhesive. It should be noted that the connecting bonding material 62 could be a cohesive material and, in this instance, a cooperating cohesive material would be included on the lower surface 38a of the second sheet of material 26a for contacting the cohesive connecting bonding material 62 on the first sheet of material 10a and cohesively bonding the first and the second sheets of material 10a and 26a together, or in any other form previously described.

The first and the second sheets of material 10a and 26a are wrapped about the floral grouping 48 (shown in FIGS. 3, 4 and 5 and described in detailed before), in a manner exactly like that described before in connection with FIGS. 3 and 4 or FIG. 5, except the connecting bonding material 64 engages and bonds with an adjacent portion of the lower surface 22a of the first sheet of material when the first and the second sheets of material 10a and 26a are wrapped about the floral grouping 48 to secure the first and the second sheets of material 10a and 26a in a wrapped condition forming the wrapper extending about the floral grouping 48.

Embodiments of FIGS. 9 and 10

Shown in FIG. 9 is another modified first sheet of material lob which is constructed exactly like the sheet of material 10a shown in FIG. 1 and described in detail before, except the sheet of material 10b has a connecting bonding material 66 also disposed on the upper surface 20b thereof. The connecting bonding material 66b is in the form of a plurality of spaced apart bonding material spots. The spots of connecting bonding material 66 could be in the form of strips or the connecting bonding material 66 in fact could cooperate with the connecting bonding material 24b and cover the entire upper surface 20a of the first sheet of material 10b or it could be in any other form previously described.

The sheet of material 10b is adapted to be used with the second sheet of material 26 shown in FIG. 2 and described in detail before.

In operation, the upper surface of the first sheet of material 10b is disposed adjacent the lower surface 38 of the second sheet of material 26 and, in this position, the connecting bonding material 64 cooperates to bond the first sheet of material 10b to the second sheet of material 26, as shown in FIG. 10. The floral grouping 48 is wrapped by the first and the second sheet of material 10b and 26 in a manner like that described before with respect to FIGS. 3 and 4.

Embodiment of FIGS. 11 and 12

Shown in FIGS. 11 and 12 are yet other modified forms of the first or second sheets of material 10c or 26c (FIG. 11) or 10d or 26d (FIG. 12). The modified sheets of material 10c or 26c or 10d or 26d shown in FIGS. 11 and 12 will operate in the manner described before with respect to the other sheets of material to provide a wrapper for the floral grouping 48. The sheets of material 10c or 26c or 10d or 26d are shown in FIGS. 11 and 12 merely to illustrate that the first and the second sheets of material may have different geometric shapes, other than square and rectangular.

Embodiment of FIG. 13

Shown in FIG. 13 is a modified first sheet of material 10e connected to a modified second sheet of material 26e. The first sheet of material 10e is constructed exactly like the sheet of material 10. The second sheet of material 26e is constructed like the sheet of material 26 described in detail before and shown in FIG. 2, except the second sheet of material 26e includes a bonding material 70 disposed on the lower surface 38e of the second sheet of material 26e. The bonding material 70 is in the form of a plurality of spaced apart spots of bonding material 70, similar to that shown in FIG. 6. The lower surface 38e of the second sheet of material 26 is bondingly connected to the upper surface 20e of the first sheet of material 10e by way of the bonding material 70. Since the bonding material 70 is in the form of a plurality of spaced apart spots, a plurality of spaced apart spaces 72 (only one of the spaces 72 being designated by reference numeral in FIG. 13) are formed between the lower surface 38e of the second sheet of material 26e and the upper surface 20e of the first sheet of material 10e. The spaces 72 provide air gaps which form an insulation when the first and the second sheets of material 10e and 26e are wrapped about a floral grouping in a manner and for reasons like that described before.

Figure 14:
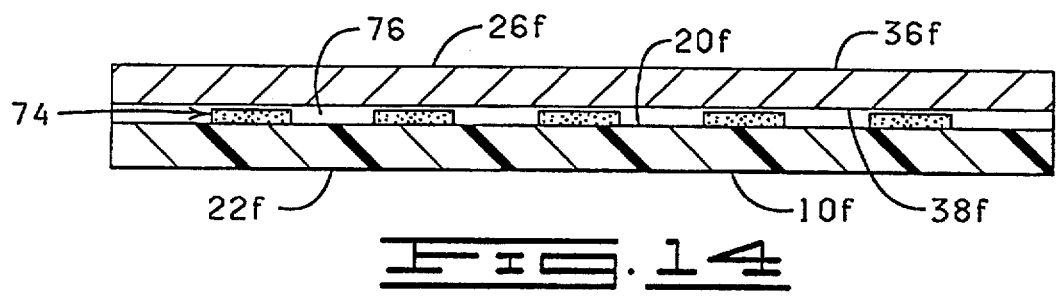
FIG. 14 is another cross-sectional view of a modified first sheet of material connected to a modified second sheet of material.

Embodiment of FIG. 14

Shown in FIG. 14 is a modified first sheet of material 10f connected to a modified second sheet of material 26f. The first sheet of material 10f is constructed exactly like the sheet of material 10 shown in FIG. 1, except the first sheet of material 10f includes a bonding material 74 disposed on the upper surface 20f of the first sheet of material 10f. The bonding material 74 is in the form of a plurality of spaced apart spots of bonding material 74, similar to that shown in FIG. 6. The lower surface 38f of the second sheet of material 26f is bondingly connected to the upper surface 20f of the first sheet of material 10f by way of the bonding material 74. Since the bonding material 74 is in the form of a plurality of spaced apart spots, a plurality of spaces 76 (only one of the spaces 76 being designated by a reference numeral in FIG. 14) are formed between the lower surface 38f of the second sheet of material 26f and the upper surface 20f of the first sheet of material 10f. The spaces 76 provide air gaps which form an insulation when the first and the second sheets of material 10f and 26f are wrapped about a floral grouping in

9 a manner and for reasons like that described before in connection with FIG. 13.

Figure 15:
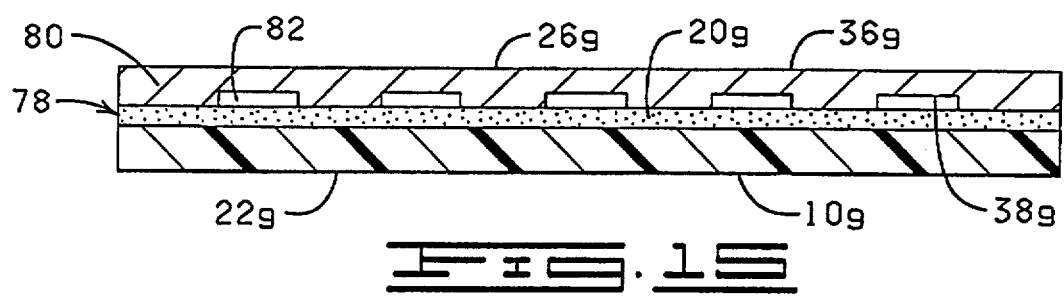
FIG. 15 is a cross sectional view of still another modified first sheet of material connected to a modified second sheet of material.

Embodiment of FIG. 15

Shown in FIG. 15 is a modified first sheet of material 10g connected to a modified second sheet of material 26g. The first sheet of material 10g is constructed exactly like the sheet of material shown in FIG. 1, except the first sheet of material 10g includes a bonding material 78 on the upper surface 20g thereof. The second sheet of material 26g is constructed exactly like the second sheet of material 26 shown in FIG. 2, except the second sheet of material 26g includes a plurality of spaced apart raised portions 80 (only one of the raised portions 80 being designated with a reference numeral in FIG. 15). The raised portions 80 may be formed by embossing the second sheet of material 26g or forming corrugations in the second sheet of material 26g or in any other manner desired in any particular application.

The upper surface 20g of the first sheet of material 10g is disposed generally adjacent the lower surface 38g of the second sheet of material 20g or, more particularly, adjacent the raised portions 80 on the second sheet of material 26g. In this position, the raised portions 80 are bonded to the upper surface 20g of the first sheet of material 10g by way of the bonding material 78 to connect the first sheet of material 10g to the second sheet of material 20g.

The spaced apart raised portions 80 on the second sheet of material 26g form a plurality of spaces 82 between the first sheet of material 10g and the second sheet of material 26g in a connected position of the first and the second sheets of material 10g and 26g for providing insulation when the first and second sheets of material 10g and 26g are connected together and wrapped about a floral grouping in a manner like that described before.

Figure 16:
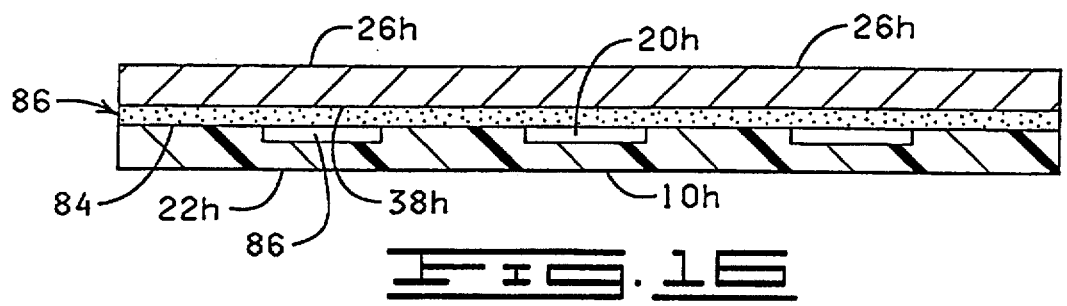
FIG. 16 is another cross-sectional view of yet another modified first sheet of material connected to a modified second sheet of material.

Embodiment of FIG. 16

Shown in FIG. 16 is a modified first sheet of material 10h connected to a modified second sheet of material 26h. The first sheet of material 10h is constructed exactly like the sheet of material 10 shown in FIG. 1, except the first sheet of material 10h includes a plurality of spaced apart raised portions 84 (only one of the raised portions being designated by a reference numeral in FIG. 16). The raised portions 84 may be formed in the first sheet of material 10h by embossing the first sheet of material 10h or forming corrugations in the first sheet of material 10h or in any other suitable manner. The second sheet of material 26h is constructed exactly like the second sheet of material 26 shown in FIG. 2, except the second sheet of material 26h includes a bonding material 86 disposed on the lower surface 38h thereof.

In operation, the upper surface 20h of the first sheet of material 10h is disposed generally adjacent the lower surface 38h of the second sheet of material 26h or, more particularly, the raised portions 84 on the first sheet of material 10h are disposed adjacent the lower surface 38h of the second sheet of material 26h. In this position, the first sheet of material 10h is bondingly connected to the second sheet of material 26h by way of the bonding material 86 on the second sheet of material 26h or, more particularly, the bonding material 86h on the second sheet of material 26h bondingly engages and bondingly connects to the raised portions 84 on the first sheet of material 10h to connect the first sheet of material 10h to the second sheet of material 26h. In this connected position of the first sheet of material 10h and the second sheet of material 26h, the raised portion 84 cooperate to form a plurality of spaces 86 (only one of the spaces 86 being designated with a reference numeral in FIG. 16). Between the first sheet of material 10h and the second sheet of material 26h. The spaces 86 cooperate to provide an insulation when the first and the second sheets of material 10h and 26h are wrapped about a floral grouping in a manner and for reasons like that described before.

The first and the second sheets of material described herein can be provided in the form of a roll of first and second sheets of material where the first and the second sheets of material are unrolled from the roll of first and second sheets of material and the first and the second sheets of material are severed from the roll either by perforations at spaced apart locations in the roll or by cutting the first and the second sheets of material from the roll.

It also should be noted that additional sheets of material may be combined with the first and the second sheets of material if so desired in a particular application.

Figure 17:
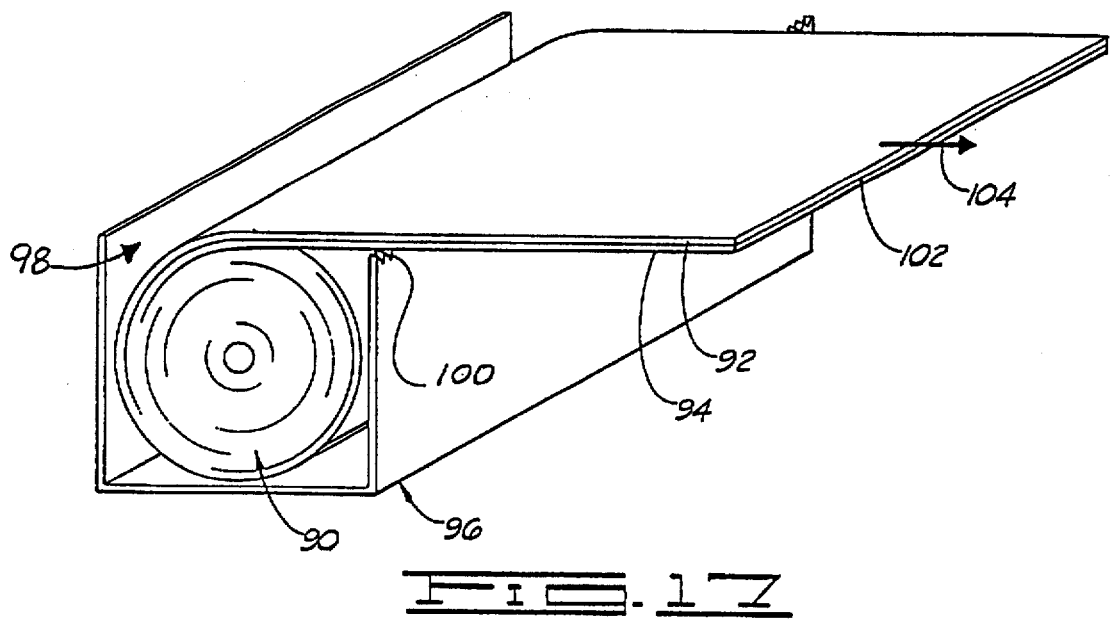
FIG. 17 is a diagrammatic view showing a roll of material wherein the roll of material comprises a first and a second sheet of material constructed in accordance with the present invention disposed in a dispenser (diagrammatically shown in FIG. 17) for dispensing the first and the second sheets of material from the roll of material.

Embodiment of FIG. 17

Shown in FIG. 17 is a roll of material 90 comprising a first material 92 and a second material 94 with the second material 94 being disposed adjacent the first material 92. The first material 94 is constructed of any of the materials described before with respect to the first sheet of material. The second material 94 is constructed of any of the materials described before with respect to the second sheet of material.

The roll of material 90 is disposed in a dispenser 96 having an opening 98 through which the materials 92 and 94 may be withdrawn from the roll of material 90. A cutting edge 100 is disposed on the dispenser 96 near the opening 98. The cutting edge 100 may be a sawtooth type of edge, as shown in FIG. 17, or the cutting edge 100 may be any other type of edge or device suitable for cutting a portion of the materials 92 and 94 from the roll of material 90 and the cutting edge 100 may be connected to the dispenser 96 or may be a separate component if desired in particular application.

The roll of material has a leading edge 102. In operation, the leading edge 102 is gripped or a portion of the first and/or the second materials are gripped and the first and the second materials are unrolled and withdrawn from the roll of material 90 in a direction 104. The first and the second materials 92 and 94 are withdrawn or unrolled from the roll of material 90 until a desired length of the first and the second materials 92 and 94 have been withdrawn from the roll of material. In this position, a portion of the first and the second materials 92 and 94 are disposed adjacent the cutting edge 100. The first and the second materials 92 and 94 then are maneuvered to pass the first and the second materials 92 and 94 over the cutting edge 100 thereby severing a portion of the material extending a distance from the leading edge 102 thereof from the roll of materials. The portion of the first and the second materials 92 and 94 withdrawn from the roll of material 90 and severed from the roll of material 90 comprise the first and the second sheets of material as described herein.

The first and the second materials 92 and 94 in the roll of material 90 may be connected or unconnected. Further, the roll of material 90 may comprise two rolls of material with one of the rolls of material comprising the first material 92 and the other roll of material comprising the second material 94. In this last-mentioned embodiment, the first material 92 is withdrawn from the first roll of material and the second material 94 is withdrawn from the second roll of material about simultaneously so that the first and the second materials 92 and 94 are provided in a manner as generally shown in FIG. 17 for severing from the first and second rolls of material to provide the first and the second sheets of material as described herein. The term "roll of material" as used herein is intended to encompass two or more rolls in the manner generally described.

Figure 18:
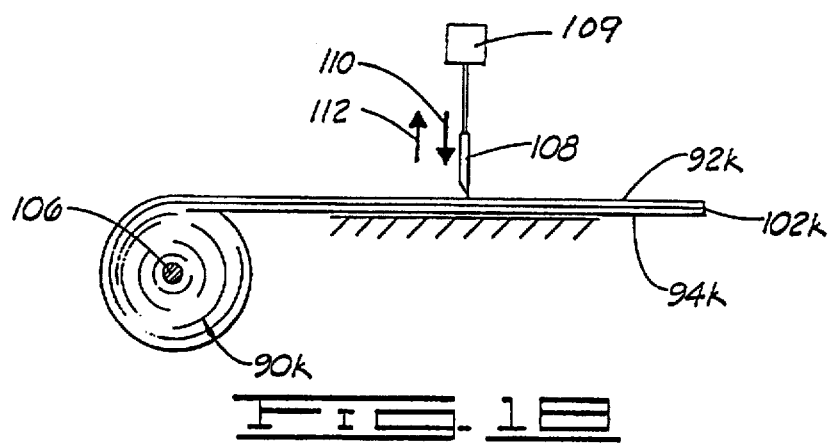
FIG. 18 is a diagrammatic view of a roll of material for dispensing a first and a second sheet of material constructed in accordance with the present invention from the roll of material.

Embodiment of FIG. 18

Shown in FIG. 18 is a modified roll of material 90k comprising a first material 92k and a second material 94k with a leading edge 102k. The roll of material 90k is constructed exactly like the roll of material 90 described before, except the roll of material 90k is not disposed in a dispenser constructed like the dispenser 96 shown in FIG. 17. Rather, the roll of material 90k is supported on a generally mounted shaft 106. The first and the second sheets of material 92k and 94k are withdrawn from the roll of material 90k in a manner like that described before in connection with FIG. 17 until a predetermined length of the first and the second materials 92k and 94k have been withdrawn from the roll of material 90k. In this position, a portion of the first and the second materials 92k and 94k are disposed under a knife edge 108. The knife edge 108 is connected to an actuator 109 adapted to move the knife edge 108 in a direction 110 and in a direction 112. When the predetermined length of the first and the second materials 92k and 94k have been withdrawn from the roll of material 90k, the actuator 109 actuates to move the knife edge 108 in the direction 110 to a position wherein the knife edge 108 severingly engages the materials 92k and 94k to severingly cut a portion of the first and the second materials 92k and 94k from the roll of materials 90k to provide the first and the second sheets of material as described herein. The actuator 109 may comprise a hydraulic or pneumatic cylinder or a motor and gear arrangement or any other form of arrangement suitable for moving the knife edge 108 in the directions 110 and 112. After the knife edge 108 has cuttingly severed the desired portion of the first and the second sheets of material 92k and 94k from the roll of material 90k, the actuator 109 is actuated to move the knife edge 108 in the direction 112 to a storage position disposed a distance above the first and the second materials 92k and 94k as opposed to the cutting position previously described.

Figure 19:
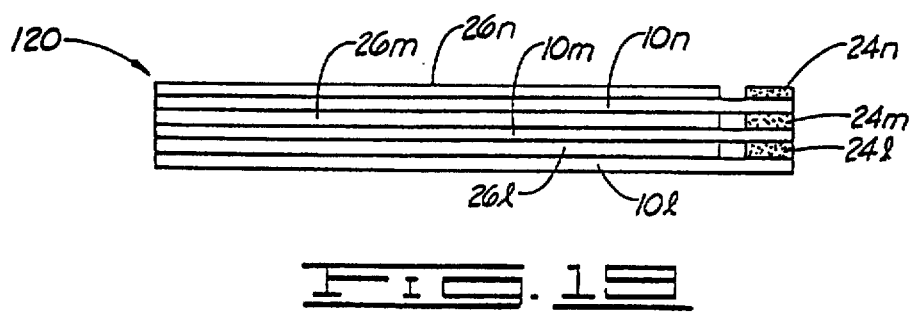
FIG. 19 is a side elevational view of a pad of first and second sheets of material constructed in accordance with the present invention.

Embodiment of FIG. 19

Shown in FIG. 19 is a pad of first sheets 120 of materials designated by the reference numerals 10L, 10m, and 10n in FIG. 19 and a plurality of second sheets of material designated in FIG. 19 by the reference numerals 26L, 26m and 26n. The first sheets of material 10L, 10m and 10n may be constructed like the sheet of material 10 shown in FIG. 1 and described in detail before and the second sheets of material 26L, 26m and 26n may be constructed like the second sheet of material 26 shown in FIG. 2 and described in detail before, or like any of the other first and the second sheets of material described herein. The first and the second sheets of material 10L, 10m, 10n, 26L, 26m and 26n are connected in the form of a pad 120 with the closure bonding material 24L, 24m and 24n cooperating to connect the first sheets of material 10L, 10m and 10n in the form of the pad 110. The second sheets of material 26L, 26m and 26n may be connected to the respective first sheets of material 10L, 10m and 10n or may be interleaved between the adjacent first sheets of material 10L, 10m and 10n in the pad 120. In the alternative, the second sheets of material 26L, 26m and 26n may be connected to form the pad 120 with the first sheets of material 10L, 10m and 10n being interleaved in the respective second sheets of material 26L, 26m and 26n and/or connected thereto. In operation, the floral grouping 48 may be placed on the top sheet of material in the pad 120 and the first and the second sheets of material comprising the top sheet of material may be wrapped about the floral grouping 48 and removed from the pad 120. In the alternative, one of the first sheets of material 10L, 10m or 10n along with the adjacent second sheet of material 26L, 26m and 26n may be removed from the pad 120 and then wrapped about the floral grouping 48.

Changes may be made in the construction and the operation of the various components, elements and assemblies described herein or in the steps or the sequence of steps of the methods described herein without departing from the spirit and scope of the invention as defined in the following claims.

What is claimed is:

1. A method for wrapping a floral grouping comprising:
providing a pad comprising plurality of pairs of sheets of material with each pair comprising a first sheet of material and a second sheet of material with each first sheet of material in the pair having an upper surface and a lower surface and each second sheet of material in the pair having an upper surface and a lower surface, and wherein at least a portion of the lower surface of the second sheet is disposed adjacent and connected to at least a portion of the upper surface of the first sheet;
separating the pair of sheets of material from the pad to provide the first sheet of material and the second sheet of material wherein at least a portion of the lower surface of the second sheet of material is disposed adjacent at least a portion of the upper surface of the first sheet of material;
providing the floral grouping having a bloom end and a stem end;
disposing the floral grouping adjacent at least one of the first and the second sheets of material; and
wrapping the first and the second sheets of material about the floral grouping to provide a wrapper.

2. The method of claim 1 wherein in the step of providing the pad, the first sheet of material is defined further as constructed of a material selected from a group of materials consisting of metal foil, cloth (natural or synthetic), denim, burlap or polymer film or combinations thereof.

3. The method of claim 1 wherein in the step of providing the pad, the second sheet of material is defined further as constructed from a material for providing insulation for the floral grouping when the first and the second sheets of material are wrapped about the floral grouping.

4. The method of claim 1 wherein in the step of providing the pad, at least one of the first sheet of material and the second sheet of material is defined further as having a plurality of raised portions which form spaces between the adjacent surfaces of the first and second sheets of material to provide insulation for the floral grouping.

5. The method of claim 1 wherein in the step of providing the pad, the second sheet of material is constructed of paper and in the step of wrapping the wrapper, the wrapper is formed to have a paper surface disposed adjacent the floral grouping.

6. A method for wrapping a floral grouping comprising:

providing a pad comprising plurality of pairs of sheets of material with each pair comprising a first sheet of material and a second sheet of material with each first sheet of material in the pair having an upper surface and a lower surface and each second sheet of material in the pair constructed of paper and having an upper surface and a lower surface, at least a portion of the lower surface of the second sheet disposed adjacent at least a portion of the upper surface of the first sheet;

separating the pair of sheets of material from the pad to provide the first sheet of material and the second sheet of material wherein at least a portion of the lower surface of the second sheet of material is disposed adjacent at least a portion of the upper surface of the first sheet of material;

providing a floral grouping having a bloom end and a stem end;

disposing the floral grouping adjacent at least one of the first sheet and second sheet of material; and wrapping the first and the second sheets of material about the floral grouping to provide a wrapper.

7. The method of claim 6 wherein in the step of wrapping the wrapper, the wrapper is formed to have a paper surface disposed adjacent the floral grouping.

8. The method of claim 6 wherein in the step of providing the pad, the first sheet of material is defined further as constructed of a material selected from a group of materials consisting of metal foil, cloth (natural or synthetic), denim, burlap or polymer film or combinations thereof.

9. The method of claim 6 wherein in the step of providing the pad, the second sheet of material is defined further as constructed from a material for providing insulation for the floral grouping when the first and the second sheets of material are wrapped about the floral grouping.

10. The method of claim 6 wherein in the step of providing the pad, at least one of the first sheet of material and the second sheet of material is defined further as having a plurality of raised portions which form spaces between the adjacent surfaces of the first and second sheets of material to provide insulation for the floral grouping.

* * * * *